US010677598B2

(12) United States Patent
Linder et al.

(10) Patent No.: US 10,677,598 B2
(45) Date of Patent: Jun. 9, 2020

(54) MAP-CENTRIC MAP MATCHING METHOD AND APPARATUS

(71) Applicant: HERE Global B.V., Eindhoven (NL)

(72) Inventors: Eric Linder, Downers Grove, IL (US); Dongwook Jang, Lisle, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 195 days.

(21) Appl. No.: 15/989,798

(22) Filed: May 25, 2018

(65) Prior Publication Data

US 2019/0360818 A1 Nov. 28, 2019

(51) Int. Cl.
*G01C 21/00* (2006.01)
*G01C 21/32* (2006.01)
*G06F 16/29* (2019.01)

(52) U.S. Cl.
CPC ............ *G01C 21/32* (2013.01); *G06F 16/29* (2019.01)

(58) Field of Classification Search
CPC ................................ G01C 21/32; G06F 16/29
See application file for complete search history.

(56) References Cited

U.S. PATENT DOCUMENTS

2010/0217517 A1 8/2010 Oohashi et al.
2010/0217524 A1 8/2010 Oohashi et al.
2011/0208426 A1 8/2011 Zheng et al.
2011/0257885 A1 10/2011 Tuck et al.
2017/0332198 A1* 11/2017 Dannenbring .......... G01S 13/06
2018/0356235 A1* 12/2018 Jang ...................... G01C 21/32

FOREIGN PATENT DOCUMENTS

CN 101750082 A 6/2010

OTHER PUBLICATIONS

Wang et al., "New Map-matching Method based on Decision Circle for GNSS-based ETC Systems" Research Institute of Highway, MOC, National Intelligent Transport Systems Center of Engineering and Technology, Beijing.

* cited by examiner

*Primary Examiner* — Adam M Alharbi
(74) *Attorney, Agent, or Firm* — Alston & Bird

(57) ABSTRACT

A method, apparatus and computer program product are provided to process probe data in accordance with a map-centric map matching technique. Methods may include obtaining a road link from a database of a plurality of road links; calculating a boundary separation distance for spacing vertices along a length of the road link; determining a sequence of vertices along the road link according to the boundary separation distance; generating, for each vertex, a spatial boundary where an overlap between spatial boundaries of adjacent vertices extends a first distance from the road link, where the first distance is a minimum distance from the road link; and providing for storage of a spatial boundary structure for the road link including the plurality of spatial boundaries associated with the road link.

20 Claims, 5 Drawing Sheets

MAP-CENTRIC MAP MATCHING METHOD AND APPARATUS

TECHNOLOGICAL FIELD

An example embodiment relates generally to the map matching of probe points to a corresponding road segment as represented by a map and, more particularly, to the map matching of probe points to road segments in a map-centric manner.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle. Map matching for real time applications may only utilize the path of probe points up to the most recent probe point since those are the only probe points that are known. Alternatively, map matching may rely upon post-processing, such as in instances in which the probe points captured by a plurality of GPS systems or navigation systems are matched to the road segments represented by a map for traffic estimation or other purposes. The accuracy of the map matching provided by post-processing may be improved relative to the map matching for real time applications since probe points captured subsequent in time to the probe point currently being processed are also known and may be referenced during the post-processing.

A variety of probe-centric map matching techniques have been developed. These map matching techniques include map matching techniques that utilize geometric analysis including point-to-point analysis, point-to-curve analysis and trajectory techniques. Other map matching techniques utilize a topological analysis of the road network to improve accuracy and performance. Some map matching techniques utilize probabilistic map-matching algorithms. The probabilistic map-matching algorithms attempt to identify the most probable road segment in some confidence region about a respective probe point. Additionally or alternatively, probabilistic map-matching algorithms may attempt to identify the most probable path in addition to the most probable road segment. The probabilistic map-matching algorithms may include, for example, Viterbi and hidden Markov model techniques. Further, map-matching techniques may include other types of map-matching algorithms including those that utilize Kalman and extended Kalman based techniques and those that utilize particle filters.

Whether performed in real time or as a post-processing technique, map matching has been a probe-centric process in which each probe point is analyzed to identify the closest road segment and the projection of the probe point onto the closest road segment. In order to identify the closest road segment, a separate spatial search is generally conducted for each probe point; even in instances in which a probe point is spaced a substantial distance from any road segment. Thus, the number of spatial searches to be conducted is generally proportional to the number of probe points.

Spatial searches are computationally expensive. For example, probe-centric map matching techniques for large probe data sets, such as millions of probe points, can incur substantial execution time and costs since the number of spatial searches is proportional to the number of probe points. Thus, map matching and, in particular, the spatial searches for each of the probe points may become a limiting factor at least for real time applications.

BRIEF SUMMARY

A method, apparatus and computer program product are provided in accordance with an example embodiment in order to process probe data in accordance with a map-centric map matching technique. By utilizing a map-centric map matching technique, the method, apparatus and computer program product of an example embodiment may, in many instances, require less processing capacity and may improve efficiency while decreasing or eliminating latency in map matching probe data points to road links. Embodiments may provide an apparatus to map match probe data points to a road segment including at least one processor and at least one non-transitory memory including computer program code instructions. The computer program code instructions may be configured to, when executed, cause the apparatus to at least: obtain a road link from a database of a plurality of road links; calculate a boundary separation distance for spacing vertices along a length of the road link; determine a sequence of vertices along the road link according to the boundary separation distance; generate, for each vertex, a spatial boundary, where an overlap between spatial boundaries of adjacent vertices extends a first distance from the road link, where the first distance is a minimum distance from the road link; and provide for storage of a spatial boundary structure for the road link including the plurality of spatial boundaries associated with the road link. The apparatus of some embodiments may be caused to receive a probe data point including a location; determine a spatial boundary within which the probe data point location falls; and map-match the probe data point to the road link.

According to some embodiments, the spatial boundary generated for each vertex may include a circle having a radius less than the spatial boundary distance, and an intersection between adjacent spatial boundaries along the road link may be disposed at least a predefined tolerance distance from the road link. The apparatus of some embodiments may be caused to map match the received probe data point to a sub-segment of the road link based on the determined spatial boundary within the spatial boundary structure and a sub-segment of the road link corresponding to the vertex of the determined spatial boundary. The road link may be a first road link, where the apparatus of some embodiments may be caused to: obtain a second road link from the database of a plurality of road links; determine a sequence of vertices along the second road link according to the boundary separation distance; and for each vertex of the second road link, generate a spatial boundary where an overlap between spatial boundaries of adjacent vertices extends a first distance from the second road link, where the first distance is a minimum distance from the first road link. Causing the apparatus to determine a spatial boundary within which the probe data point falls may include causing the apparatus to determine a first spatial boundary of the first road link within which the probe data point location falls, and a second spatial boundary of the second road link within which the probe data point falls, where the apparatus is cause to: compute the probability of the probe data point belonging to the first road link; compute the probability of the probe data point belonging to the second road link; and map match the probe data point to the one of the first road link or the second road link with the higher probability.

According to some embodiments, causing the apparatus to provide for storage of the spatial boundary structure for the road link may include causing the apparatus to: identify a map tile associated with the road link based on an anchor node of the road link; and provide for storage of the spatial boundary structure for the road link in association with the identified map tile. Causing the apparatus of example embodiments to determine a sequence of vertices along the road link according to the boundary separation distance may include causing the apparatus to: identify a latitude and longitude of a first vertex of the sequence of vertices; determine a directional angle of a next vertex of the sequence of vertices; and calculate a latitude and longitude of the next vertex based on the latitude and longitude of the first vertex, the boundary separation distance, and the directional angle of the next vertex. The apparatus of example embodiments may be caused to provide for at least one of navigation assistance or at least semi-autonomous vehicle control of a vehicle associated with the probe data point along the road link in response to the probe data point being map matched to the road link.

Embodiments provided herein may provide a computer program product including at least one non-transitory computer-readable storage medium having computer-executable program code portions stored therein. The computer-executable program code portions including program code instructions configured to: obtain a road link from a database of a plurality of road links; calculate a boundary separation distance for spacing of vertices along a length of the road link; determine a sequence of vertices along the road link according to the boundary separation distance; generate, for each vertex, a spatial boundary, where an overlap between spatial boundaries of adjacent vertices extends in a first direction from the road link, where the first distance is a minimum distance from the road link; and provide for storage of a spatial boundary structure for the road link including the plurality of spatial boundaries associated with the road link. A probe data point including a location may be received, where a spatial boundary is determined within which the probe data point location falls, and the probe data point may be map-matched to the road link.

The spatial boundary generated for each vertex may include a circle having a radius less than the spatial boundary distance, where an intersection between adjacent spatial boundaries along the road link may be disposed at least a predefined tolerance distance from the road link. The computer program product may include program code instructions configured to map match the received probe data point to a sub-segment of the road link base on the determined spatial boundary within the spatial boundary structure and a sub-segment of the road link corresponding to the vertex of the determined spatial boundary. The road link may be a first road link, where the computer program product may include program code instructions configured to: obtain a second road link from the database of a plurality of road links; determine a sequence of vertices along the second road link according to the boundary separation distance; and, for each vertex of the second road link, generate a spatial boundary where an overlap between spatial boundaries of adjacent vertices extends a first distance from the second road link, where the first distance is a minimum distance from the second road link. The program code instructions to determine a spatial boundary within which the probe data point location falls may include program code instructions to determine a first spatial boundary of the first road link within which the probe data point location falls and a second spatial boundary of the second road link within which the probe data point falls. The computer program product may further include program code instructions to compute the probability of the probe data point belonging to the first road link; compute the probability of the probe data point belonging to the second road link; and map match the probe data point to the one of the first road link or second road link with the higher probability.

The program code instructions to provide for storage of the spatial boundary structure for the road link may include program code instructions to: identify a map tile associated with the road link based on an anchor node of the road link; and provide for storage of the spatial boundary structure for the road link in association with the identified map tile. The program code instructions to determine a sequence of vertices along the road link according to the boundary separation distance may include program code instructions to: identify a latitude and longitude of a first vertex of the sequence of vertices; determine a directional angle of a next vertex of the sequence of vertices; and calculate a latitude and longitude of the next vertex based on the latitude and longitude of the first vertex, the boundary separation distance, and the directional angle of the next vertex. The computer program product may include program code instructions to provide for at least one of navigation assistance or at least semi-autonomous vehicle control of a vehicle associated with the probe data point along the road link in response to the probe data point being map matched to the road link.

Embodiments described herein may provide a method including: obtaining a road link from a database of a plurality of road links; calculating a boundary separation distance for spacing vertices along a length of the road link; determining a sequence of vertices along the road link according to the boundary separation distance; generating, for each vertex, a spatial boundary where an overlap between spatial boundaries of adjacent vertices extends a first distance from the road link, where the first distance is a minimum distance from the road link; and providing for storage of a spatial boundary structure for the road link including the plurality of spatial boundaries associated with the road link. Methods may include receiving a probe data point including a location; determining a spatial boundary within which the probe data point location falls; and map matching the probe data point to the road link. The spatial boundary generated for each vertex may include a circle having a radius less than the spatial boundary distance, and an intersection between adjacent spatial boundaries along the road link may be disposed at least a predefined distance from the road link. Methods may include map matching the received probe data point to a sub-segment of the road link based on the determined spatial boundary within the spatial boundary structure and a sub-segment of the road link corresponding to the vertex of the determined spatial boundary.

According to some embodiments, the road link may be a first road link, where the method may include: obtaining a second road link from the database of a plurality of road links; determining a sequence of vertices along the second road link according to the boundary separation distance; for each vertex of the second road link, generating a spatial boundary where an overlap between spatial boundaries of adjacent vertices extends a first distance from the second road link, where the first distance is a minimum distance from the second road link. Determining a spatial boundary within which the probe data point location falls may include determining a first spatial boundary of the first road link within which the probe data point location falls and a second spatial boundary of the second road link within which the probe data point falls. Methods may include computing the probability of the probe data point belonging to the first road link; computing the probability of the probe data point belonging to the second road link; and map matching the probe data point to the one of the first road link or the second road link with the higher probability. Providing for storage of the spatial boundary structure may include: identifying a map tile associated with the road link based on an anchor node of the road link; and providing for storage of the spatial boundary structure for the road link in association with the identified map tile. Determining a sequence of vertices along the road link according to the boundary separation distance may include: identifying a latitude and longitude of a first vertex of the sequence of vertices; determining a directional angle of a next vertex of the sequence of vertices; and calculating a latitude and longitude of the first vertex, the boundary separation distance, and the directional angle of the next vertex.

Embodiments described herein may provide an apparatus including: means for obtaining a road link from a database of a plurality of road links; means for calculating a boundary separation distance for spacing vertices along a length of the road link; determining a sequence of vertices along the road link according to the boundary separation distance; means for generating, for each vertex, a spatial boundary where an overlap between spatial boundaries of adjacent vertices extends a first distance from the road link, where the first distance is a minimum distance from the road link; and means for providing for storage of a spatial boundary structure for the road link including the plurality of spatial boundaries associated with the road link. Apparatuses may include means for receiving a probe data point including a location; means for determining a spatial boundary within which the probe data point location falls; and means for map matching the probe data point to the road link. The spatial boundary generated for each vertex may include a circle having a radius less than the spatial boundary distance, and an intersection between adjacent spatial boundaries along the road link may be disposed at least a predefined distance from the road link. Apparatuses may include means for map matching the received probe data point to a sub-segment of the road link based on the determined spatial boundary within the spatial boundary structure and a sub-segment of the road link corresponding to the vertex of the determined spatial boundary.

According to some embodiments, the road link may be a first road link, where the apparatus may include: means for obtaining a second road link from the database of a plurality of road links; means for determining a sequence of vertices along the second road link according to the boundary separation distance; for each vertex of the second road link, means for generating a spatial boundary where an overlap between spatial boundaries of adjacent vertices extends a first distance from the second road link, where the first distance is a minimum distance from the second road link. The means for determining a spatial boundary within which the probe data point location falls may include means for determining a first spatial boundary of the first road link within which the probe data point location falls and a second spatial boundary of the second road link within which the probe data point falls. Apparatuses may include means for computing the probability of the probe data point belonging to the first road link; means for computing the probability of the probe data point belonging to the second road link; and means for map matching the probe data point to the one of the first road link or the second road link with the higher probability. The means for providing for storage of the spatial boundary structure may include: means for identifying a map tile associated with the road link based on an anchor node of the road link; and means for providing for storage of the spatial boundary structure for the road link in association with the identified map tile. The means for determining a sequence of vertices along the road link according to the boundary separation distance may include: means for identifying a latitude and longitude of a first vertex of the sequence of vertices; means for determining a directional angle of a next vertex of the sequence of vertices; and means for calculating a latitude and longitude of the first vertex, the boundary separation distance, and the directional angle of the next vertex.

BRIEF DESCRIPTION OF THE DRAWINGS

Figure 1:
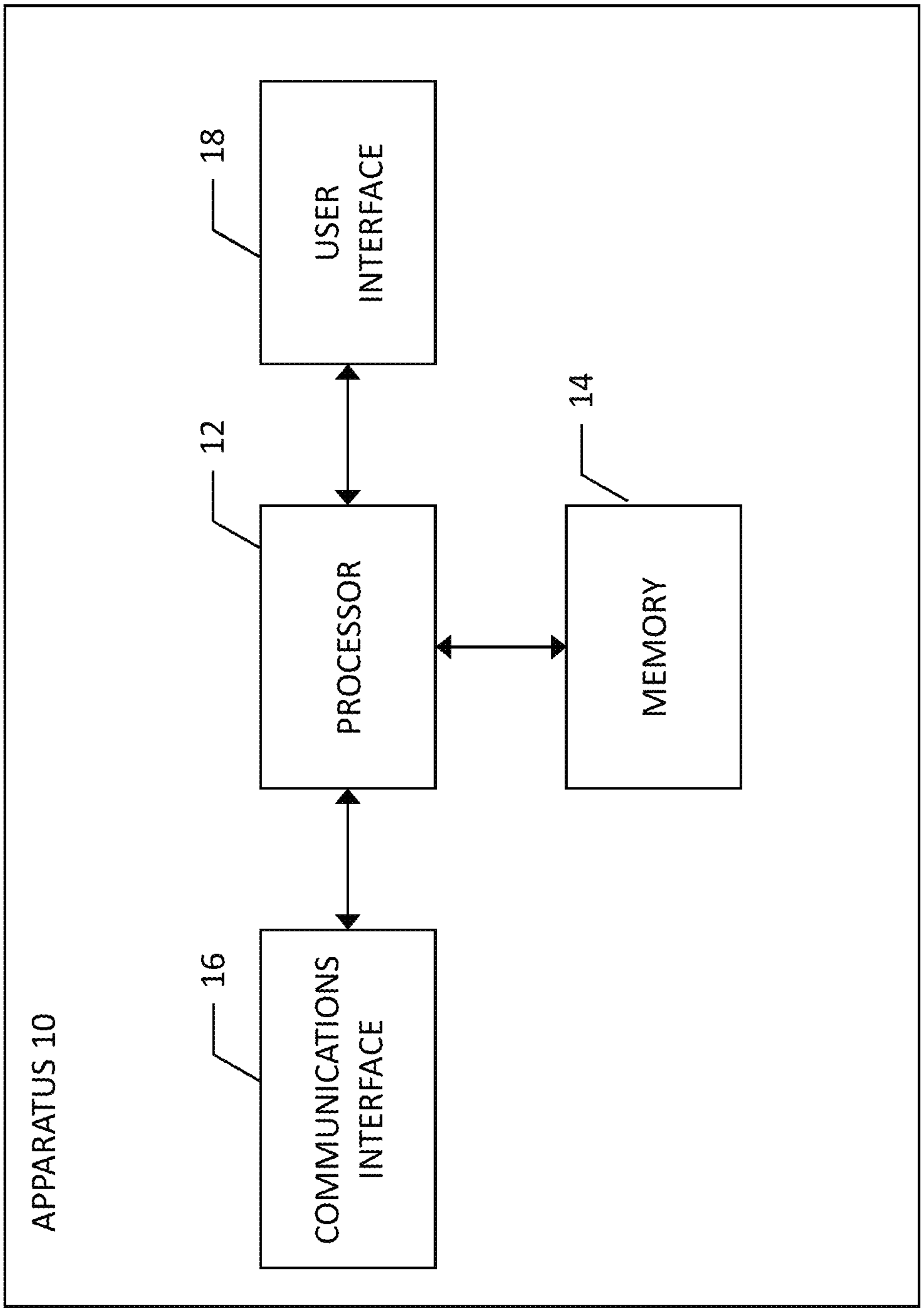
Figure 2:
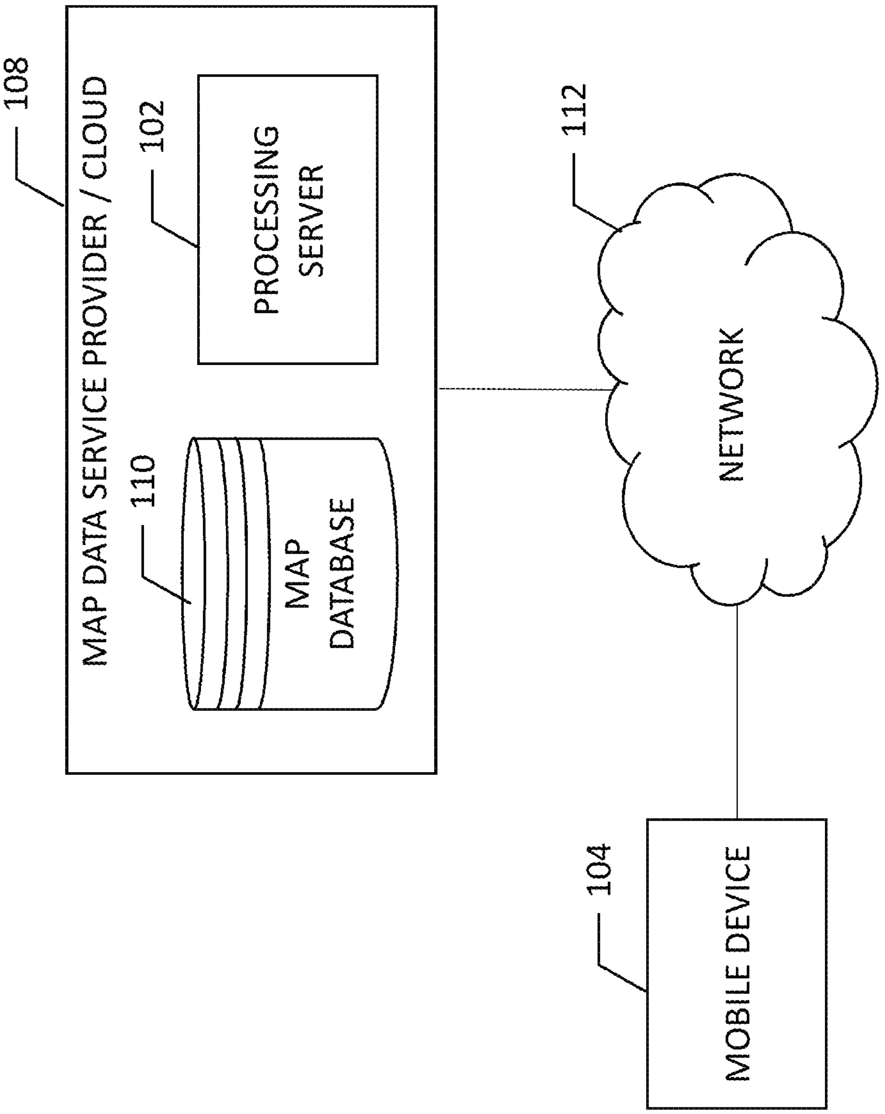
Figure 3:
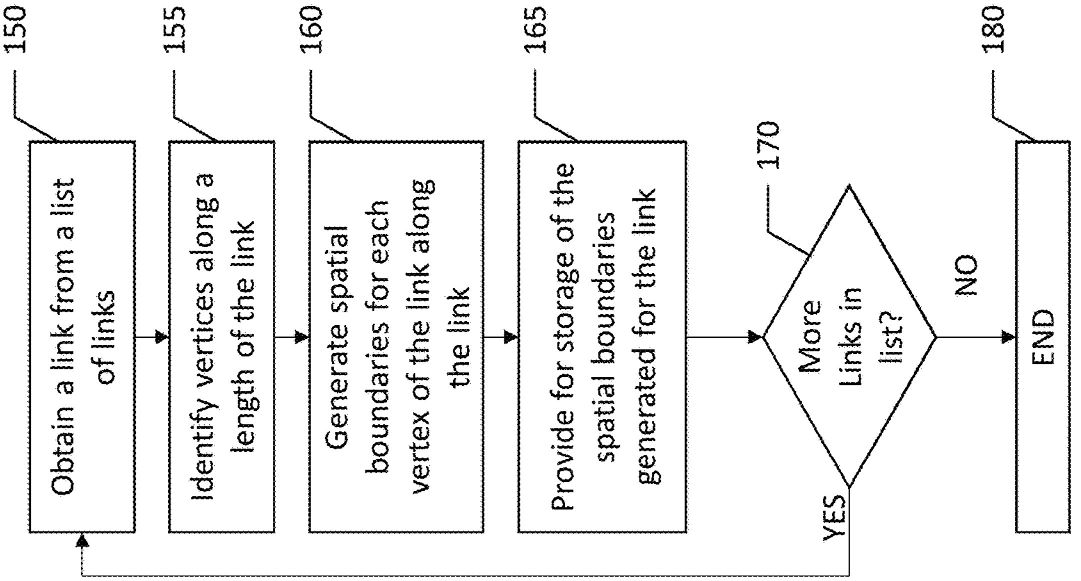
Figure 4:
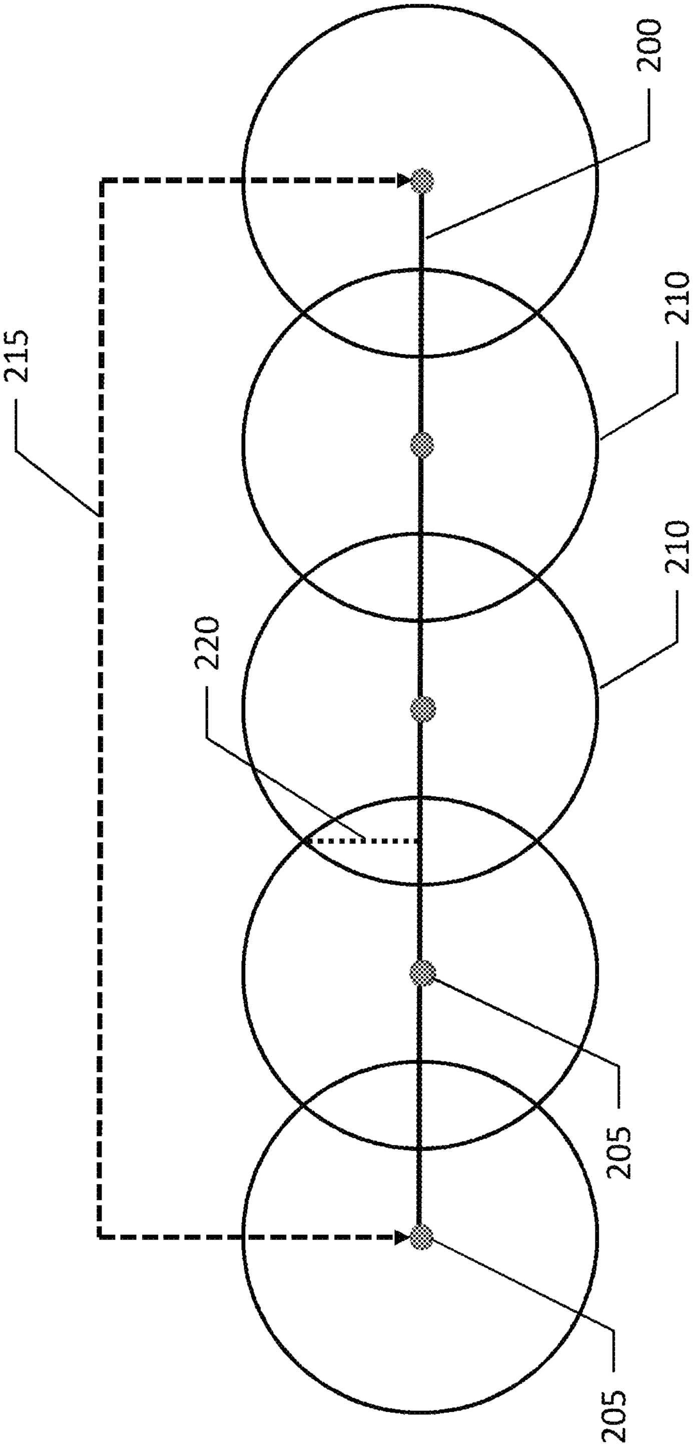
Figure 5:
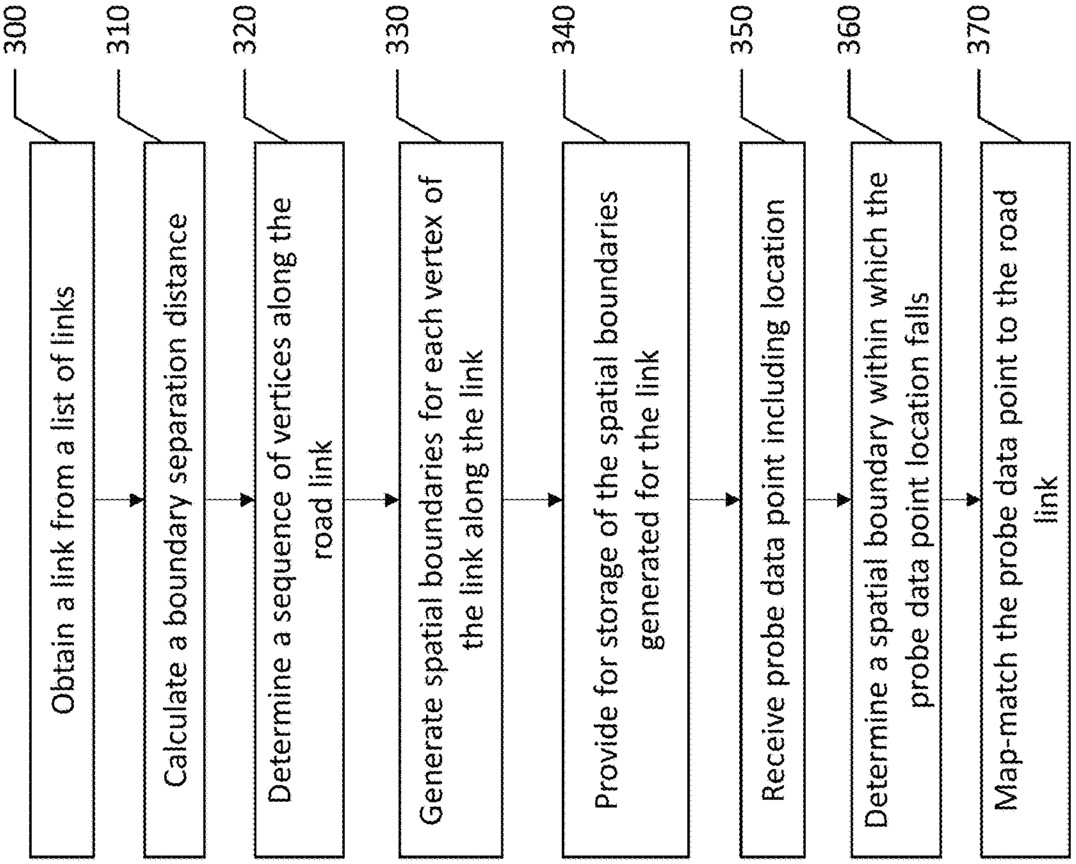

Having thus described certain example embodiments of the present disclosure in general terms, reference will hereinafter be made to the accompanying drawings, which are not necessarily drawn to scale, and wherein:

FIG. 1 is a block diagram of an apparatus according to an example embodiment of the present invention;

FIG. 2 is a block diagram of a system for identifying the probability of a plurality of paths comprising road segments according to an example embodiment of the present invention;

FIG. 3 is a flowchart illustrating the operations performed, such as by the apparatus of FIG. 1, in order to establish spatial boundaries associated with road links in accordance with an example embodiment of the present invention;

FIG. 4 illustrates a road link including spatial boundaries disposed at spaced apart vertices along a length of the road link in accordance with an example embodiment of the present invention;

FIG. 5 is a flowchart illustrating the operations performed, such as by the apparatus of FIG. 1, in order to map-match one or more probe data points to a road link within a network of roads in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms “data,” “content,” “information,” and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to allow probe data points to be matched to road links or segments as represented by a map in a computationally efficient manner. In this regard, the method, apparatus and computer program product of an example embodiment use a map-centric map matching technique that pre-computes areas of interest for point-to-curve map matching that allows more efficient map-matching by removing distance computations for each point and replaces such calculations with pre-computed polygons. Embodiments described herein compute areas of interest offline or during periods of low processing usage and stores the areas of interest for use during map-matching. Since the map matching may be performed more efficiently in a pre-computed, map-centric manner, the method, apparatus and computer program product of an example embodiment may be configured to support not only post-processing applications, but also real time applications that demand relatively timely map matching of the probe points.

The apparatus of an example embodiment may be embodied by a variety of computing devices including, for example, such as a navigation system, an advanced driver assistance system (ADAS), a GPS system or the like. Additionally or alternatively, the apparatus may be embodied in other types of computing devices, such as a server, a personal computer, a computer workstation, a laptop computer, a plurality of networked computing devices or the like, that are configured to analyze probe points, such as for traffic estimation or other purposes. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

In order to maximize the effectiveness of the utilization of a map database 110 and an ADAS or navigation system operating therewith, it is imperative to accurately determine where a probe data point or associated position of a vehicle is located within a network of road links or segments. Without accurate map-matching of probe data points to road links, map data obtained from the probe data points or map services provided to a vehicle functioning as a probe may be erroneous or lack usefulness. Therefore accurate map-matching of probe data to road links within a road network is critical to the accuracy and usefulness of map data, whether it is in the form of navigation, autonomous or semi-autonomous vehicle control, point-of-interest information, route guidance, or the like. Embodiments described herein provide an accurate method of map-matching in a computationally efficient manner to reduce processing costs while improving the speed of map-matching.

In order to provide for map matching of probe data as represented by a plurality of probe points in a map-centric fashion, reference is now made to FIG. 3 in which the operations performed, such as by the apparatus 10 of FIG. 1, are depicted. In this regard, the apparatus of an example embodiment includes means, such as the processor 12, the memory 14, the communication interface 16 or the like, for processing a list of links or road segments from among a plurality of road segments in a database for a network of roads. The operations represented in FIG. 3 are performed in advance of map matching operations and can be performed during periods of low processor utilization. For example, a map services provider 108 may perform the operations of FIG. 3 during periods of low map service data usage, such as during the night after traffic volumes have diminished and before morning traffic volumes begin to increase, resulting in higher user demand of mapping services.

As shown in FIG. 3, a link is obtained from among a list of links at 150. The list of links may be a list of road links for a geographical region stored, for example, in map database 110. The road links of the database may be prioritized according to a road classification indicative of how many vehicles traverse the road links. More popular road links may be prioritized over less popular road links as the map matching process of more popular road links will benefit more people. A link from the list of links is obtained at 150 and vertices along the link are identified at 155. Identifying vertices along the length of the link, as described further below, involves identifying points along the link that are spaced apart from a prior point along the link by a predefined distance, beginning with an end point or node of the link, and ending at the opposite end point or node. For each vertex, a spatial boundary may be generated at 160. The spatial boundary may, for example, be a polygon that is centered at one of the identified points/vertices along the link. The vertices or link segments and the associated spatial boundary may be stored at 165. At 170, a determination is made as to whether there are more road links in the list such that if more links exist, the process returns to operation 150 to obtain another link. If no further links exist in the list, the process may end at 180.

Identifying vertices along a length of the road link which essentially divides the link into a plurality of sub-segments may be performed according to a particular distance or length of each sub-segment or a distance between each identified vertex. In an instance in which a road link is a straight line, point latitude and longitude for each vertex may be computed at increments of a distance (S) along the link. Given the initial point latitude and longitude of the starting point or node of the link, all points along the link can be computed proceeding in the same direction along the link at the set distance (S) between the vertices/points. However, in the case where a link curves, not all points will be computed in this straight line using the same direction. In such a scenario, the angle-from-north will change based on the curvature of the link.

To compute points at incremental distances along a link, a straight link will be of lower complexity than a curved link. The processing expense of calculating a curved road link case is greater than a straight road link case. For a curved road link, the next point along a link, beginning with the latitude and longitude of the starting point or node of the link, would be computed after converting a spline to a piece wise linear equation or a computation of a tangent of the curve. In the straight road link case, the same angle-from-north is used for each next point calculation.

Embodiments described herein avoid the need to compute a distance to a next point along a road link and avoid the computation of a latitude and longitude of the next point along a road link as the distance is fixed at boundary separation distance (S). Further, in an instance in which the spatial boundary for a sub-segment of a road link is a circle, example embodiments described herein do not require computation of correct radii to get spacing of spatial boundary circles of interest centers at the right distance from one another, as described further below.

A next vertex/point computation can be performed through a series of equations based on the distance between points along the link (S), a radius of the earth (R), and the direction al angle in degrees from the north for the angle associated with the direction to the next point based on a latitude and longitude of origin. An initial point located at "latA" and "lonA" for latitude and longitude can be used to determine a next point latitude and longitude "latB" and "lonB" as follows:

```
latA = radians(lat1)          #a multiplication of Pi/180.0
lonA = radians(lon1)   #a multiplication of Pi/180.0
latB = asin(sin(latA) *cos(S/R) + cos(latA) *sin(S/R) *
    cos directional_angle_in_degrees))
lonB = lonA + atan2 (sin(brng) * sin(S/R) * cos(latA), cos(S/R)
    - sin (latA) * sin (latB))
lat_result = degrees(latB)          #a multiplication of 180.0/Pi
lon_result = degrees(lonB)   #a multiplication of 180.0/Pi
```

The spatial boundary distance (S) along the link would be the same between each point along the link except for potentially the last point, which may be at a distance shorter than (S) from a prior point since road links may not be equally divisible by the distance (S). Outside of the distance between the last two points along the link, the distance (S) is only computed once and the distance remains constant. For a straight link, the direction also remains constant. For a curved link, the direction of the next point involves further computation.

As noted above, embodiments described herein may compile geographic data into a physical storage format (PSF) to organize and/or configure the data for performing navigation-related functions and/or services. This may include representing a geographical area with tiles, where the region in the map database is divided into and stored as a plurality of tiles. Each road link may be associated with the tile in which it is found or a reference point of the road link is found. To compute the tile location, the following formula may be used:

```
def partition(latitude, longitude, level):
    rowCount = float (pow(2, level))
    edgesize = 180.0/rowCount
    wgsLat = float(latitude) + 90.0
    wgsLon = float(longitude) + 180.0
    row = wgsLat / edgeSize
    col = wgsLon / edgeSize
    return [level, row, col]
```

Tiles may be organized in rows and columns logically. A level may be defined as a further division of the tiles. For each level of the division all tiles may be divided into fourths, with the exception that the first level division is in half. According to an example embodiment, at level 15, the tiles may have a width and height of approximately 610 meters. From any valid latitude and longitude, a partition calculation may be done for each link. Operations described herein can be made more efficient by setting a level to a constant 15. Only one partition calculation may be needed for each link. Upon retrieving the information for a link, every area of interest associated with that link may be returned. Each link may include a "reference node" or end point that is used to identify the link by location. According to some embodiments, the reference node may be the south most and west most node of the link. Each link would extend from the reference node to a non-reference node. Each link may be stored according to the position of the reference node in the tile containing the reference node.

For each link, the link is divided into sub-sections according to the points established along the link, spaced apart by boundary separation distance (S). At each point, a spatial boundary may be generated to capture probe data points within the spatial boundary for quick and efficient map matching of the probe data points. FIG. 4 illustrates a road link 200 that extends between nodes 215 and includes vertex points 205 that divide the link 200 into sub-segments between the points. At each point, a geometric two-dimensional enclosed shape, such as a polygon, circle, ellipse, etc. may be centered. In the instant embodiment, circles 210 are centered at points 205. The center of the circles correspond to points 205 (S) distance apart, while each circle 210 has the same radius. While circles are illustrated, embodiments may include polygons of various regular and irregular shapes, such as a rectangle which may offer unique efficiencies or advantages.

In order to ensure that the spatial area represented by the geometric shapes (polygons, circles, ellipses, etc.) captures probe data points that should be map matched to the associated road link, the spatial boundary separation distance (S) that defines the separation distance along the road link between neighboring vertices may be at least partially based on a map matching tolerance T, that is, the predefined distance within which a probe point should be map-matched to a polyline. As shown in the example embodiment of FIG. 4, the vertices 205 along the road link are separated by a spatial boundary separation distance S and the dimensions of each spatial boundary region, such as the radius $R_B$ of the circular spatial boundary region 210 centered about a respective vertex, are sized such that the boundary region about each respective vertex overlaps with the boundary regions defined for the immediately neighboring vertices in a manner in which the shortest distance 220 from the road link poly line to the intersection of the adjacent boundary regions, that is, the perpendicular distance from the road link to the point of intersection of the adjacent boundary regions 210, is always greater than the map matching tolerance T. In this regard, the distance shown as 220 is greater than the tolerance T, and the spatial boundary separation distance S may be determined from the equation: $R_B^2=T^2+(S/2)^2$ as $S=2(R_B^2-T^2)^{1/2}$, where $R_B$ is the radius of the circular boundary region 210. As such, the probe data points that are within a perpendicular distance D shown as 220 of the road link 200 will be map matched to the road link. The probe data points will fall into one, or possibly two of the boundary regions 210.

As also illustrated in FIG. 4, the boundary region 210 centered about each respective vertex overlaps the boundary regions centered about the immediately neighboring vertices, but does not intersect the boundary regions centered about the other vertices along the road segment 200, such as the boundary regions centered about the vertices that are spaced from the vertex in question by one or more intermediate vertices. Thus, each edge of the road link that extends by more than the boundary separation distance S without an internal vertex to subdivide the edge is divided by one or more internal vertices such that each edge segments that result have a length that is no greater than the spatial boundary separation distance (S).

Each road link in a network of road links may be processed through the operations described with respect to the flowchart of FIG. 3, to generate a spatial boundary representation of the road link as illustrated in FIG. 4, by which a map-matching boundary is established using a boundary separation distance (S) and a polygon, circle, or ellipse to define a boundary region 210 about each vertex or point 205 along the road link. This series of boundary regions for each road link represents a boundary of the road link within which any probe data points found are map-matched to the road link.

According to some embodiments, probe data points may not fall within one or more of the boundary regions of a road link. In such a scenario, a distance from the road link may be established, such as the shortest distance from the road link, and evaluated as to the probability that the probe data point should be map matched to the road segment.

As the map matching technique of the present application is map-centric, spatial searches are conducted within boundary regions disposed about each vertex of a road link within which probe data point locations fall. The probe data points may be put into a computationally efficient spatial data structure such as, for example, a k-d-tree to optimize the map-matching of determining a boundary region into which a probe data point falls. As the evaluation of which boundary region a probe data point belongs involves spatial boundary regions about the vertices of a road link represented by a polyline, the road links may be evaluated and additional road links having their own respective spatial boundary regions may be considered to ensure that a probe data point is properly matched to the appropriate road link. In this regard, the apparatus 10 of an example embodiment includes means, such as the processor 12 or the like, for defining a plurality of vertices along a polyline representative of a road link. Following the definition of the vertices, the polyline includes one or more sub-segments with each sub-segment extending between a pair of neighboring vertices. For example, a road link polyline may extend between a pair of end polyline vertices and additional internal vertices may be defined along the polyline between the end polyline vertices. Spatial boundaries are then generated, as described above, centered at each vertex to establish a complete spatial boundary for the road link within which probe data points are map-matched to the road link.

FIG. 5 is a flowchart for a method of map matching probe data points to a road link of a map database that is pre-populated with a spatial boundary region. As shown in block 300 of FIG. 5, the apparatus 10 of an example embodiment may include means, such as the processor 12 or the like, for obtaining a link from a list of links. This list of links may be stored, for example, in a map database 110 of a map data service provider 108. A boundary separation distance (S) may be established at 310 by, for example, the processor 12. A sequence of vertices along the road link 320 may be established through mechanisms described herein of determining a sequence of vertex positions based on a prior vertex latitude and longitude together with the boundary separation distance and an angle. Spatial boundaries may be generated for each vertex along the link as shown at 330. The spatial boundary generated at each vertex may include any size and shape (polygon, circle, ellipse, etc.), and may vary from one vertex to another; however, according to an example embodiment described herein, the spatial boundary at each vertex may be a circle of a radius that is established based upon the boundary separation distance and a matching tolerance. The spatial boundaries generated for the link may be stored, such as in map database 110 of map data service provider 108 as shown at 340. These operations 300-340 may be performed systematically to generate spatial boundaries for all or a portion of road links from among a plurality of road links for a region. The spatial boundaries may be determined and stored for road links that satisfy certain criteria, such as traffic volume traversing the link such that only those road links that are regularly traversed are subject to spatial boundary determination. Optionally, all road links may be subject to spatial boundary determination and storage, where road links may be prioritized according to road link properties, such as road class, traffic volume during a period of time, age of road link, time since road link was last subject to spatial boundary determination, or the like.

Referring again to FIG. 5, a probe data point may be received at 350 including a location represented by the probe data point. The probe data point may be received from a probe representing the location of a vehicle, and may be received via communications interface 16 before being processed by processor 12 of apparatus 10, for example. At 360, a spatial boundary for a road link may be determined in which the probe data point is located. This determination may be made based on one or more road links and their associated spatial boundaries being retrieved based on a map tile or portion thereof in which the probe data point is determined to be located, while a more refined road link determination may be made based no which of those road links include the location of the probe data point within their spatial boundary. At 370, the probe data point is map-matched with the road link within whose spatial boundary region the probe data point location falls.

One a probe data point has been map matched to a particular road link, according to some embodiments, the probe data point may be projected onto the road link. This projection may at least partially mitigate GPS or locationing error in the probe data point location. As locationing means often have error, probe data points may not fall directly on a road segment, such that map matching may help align the probe data points with an identified and mapped road link represented by a poly line. According to an example embodiment, the apparatus 10, such as the processor 12, the memory 14, or the like may associate the probe data point with a road link, and optionally, a sub-segment of the road link associated with a spatial boundary for a vertex of the road link for greater precision. In such an embodiment, the probe data point may be projected onto the road link sub-segment by a projection distance. For a probe data point that has been projected onto road link or sub-segment thereof, the apparatus 10, such as the processor 12, the memory 14 or the like, may associate the projection distance, termed the map matched distance following the projection of the probe data point, with the probe data point. In this regard, the map matched distance is the distance, such as the perpendicular distance, that the probe data point is translated from the location associated with the probe data point to the location along the road link onto which the probe point is projected. Where a probe data point is within two or more spatial boundaries, either along the same road link or along more than one road link, the projection distance may be used to establish which road link or sub-segment thereof is most likely to be the correct map matched road link.

As described above, the map matching projection distance may serve as the objective function (subject to the probe data point being within the heading tolerance of the direction of travel for the road segment) that, in turn, defines the projection criteria for map matching may incorrectly map match probes especially near bifurcations. In other embodiments, however, the projection criteria may be based on other objective functions in addition to or instead of the map matching projection distance. While a number of different objective functions may be employed, the objective function of another example embodiment is a combination of the projection distance and the angular difference with respect to a probe heading and the road link direction. Probe data point heading may be established based on a single probe data point or optionally based on a series of probe data points from the same probe which identify a trajectory of the probe as it travels through the probe data points. By also taking heading into consideration in the objective function, such an objective function could allow a probe data point to be map matched to a road link for which the heading matches better even if the map matching projection distance is larger. Furthermore, additional road attributes may also be used in an objective function to improve the likelihood of correct map matching, such as the number of lanes, road width, speed limit, functional class and estimate of typical GPS error at any point along the road. Also, in another example embodiment, a probability based map matching objective function may be used. In this embodiment, a map matching probability map may be created for each projection location along the road link that assigns a map matching probability value for probe data points that project to a location based on the respective map matching projection distance and heading difference with respect to the polyline at the projection location. Using a probability based map matching approach, the probe points are map matched to the road link yielding the highest probability of being the most likely map match location for the properties of the probe (e.g., location, heading, etc.), although additional properties may be used as well such as, for example, speed and GPS error.

Additionally, the accuracy of the map matching process may be enhanced by utilizing trajectory information to identify map matching errors. For example, the trajectory associated with probe data points may be compared to the trajectory of the road segment at the projection point p identified as the position on the road segment from which the closest projection distance extends. In an instance in which the trajectory associated with a probe data point differs from the trajectory of the road segment at the projection point p by at least a predefined differential, the map matching of the probe data point may be determined to be in error with the projection point discarded. Further, probabilistic map matching algorithms may also be utilized using speed and/or other parameters associated with the probe points to increase the confidence in the projection points to which the probe points are matched.

FIGS. 3 and 5 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to map match probe data points to a road segment including at least one processor and at least one non-transitory memory including computer program code instructions, the computer program code instructions configured to, when executed, cause the apparatus to at least:

obtain a road link from a database of a plurality of road links;

calculate a boundary separation distance for spacing vertices along a length of the road link;

determine a sequence of vertices along the road link according to the boundary separation distance;

for each vertex, generate a spatial boundary, wherein an overlap between spatial boundaries of adjacent vertices extends a first distance from the road link, wherein the first distance is a minimum distance from the road link;

provide for storage of a spatial boundary structure for the road link comprising the plurality of spatial boundaries associated with the road link;

receive a probe data point including a location;

determine a spatial boundary within which the probe data point location falls; and map-match the probe data point to the road link.

2. The apparatus of claim 1, wherein the spatial boundary generated for each vertex comprises a circle having a radius less than the spatial boundary distance, and wherein an intersection between adjacent spatial boundaries along the road link is disposed at least a predefined tolerance distance from the road link.

3. The apparatus of claim 1, wherein the apparatus is further caused to map match the received probe data point to a sub-segment of the road link based on the determined spatial boundary within the spatial boundary structure and a sub-segment of the road link corresponding to the vertex of the determined spatial boundary.

4. The apparatus of claim 1, wherein the road link is a first road link, and wherein the apparatus is further caused to:

obtain a second road link from the database of a plurality of road links;

determine a sequence of vertices along the second road link according to the boundary separation distance;

for each vertex of the second road link, generate a spatial boundary, wherein an overlap between spatial boundaries of adjacent vertices extends a first distance from the second road link, wherein the first distance is a minimum distance from the second road link;

wherein causing the apparatus to determine a spatial boundary within which the probe data point location falls comprises causing the apparatus to determine a first spatial boundary of the first road link within which the probe data point location falls and a second spatial boundary of the second road link within which the probe data point falls, the apparatus further caused to:

compute the probability of the probe data point belonging to the first road link;

compute the probability of the probe data point belonging to the second road link; and map match the probe data point to the one of the first road link or second road link with the higher probability.

5. The apparatus of claim 1, wherein causing the apparatus to provide for storage of the spatial boundary structure for the road link comprises causing the apparatus to:

identify a map tile associated with the road link based on an anchor node of the road link; and provide for storage of the spatial boundary structure for the road link in association with the identified map tile.

6. The apparatus of claim 1, wherein causing the apparatus to determine a sequence of vertices along the road link according to the boundary separation distance comprises causing the apparatus to:

identify a latitude and longitude of a first vertex of the sequence of vertices;

determine a directional angle of a next vertex of the sequence of vertices; and calculate a latitude and longitude of the next vertex based on the latitude and longitude of the first vertex, the boundary separation distance, and the directional angle of the next vertex.

7. The apparatus of claim 1, wherein the apparatus is further caused to:

provide for at least one of navigation assistance or at least semi-autonomous vehicle control of a vehicle associated with the probe data point along the road link in response to the probe data point being map matched to the road link.

8. A computer program product comprising at least one non-transitory computer-readable storage medium having computer-executable program code portions stored therein, the computer-executable program code portions comprising program code instructions configured to:

obtain a road link from a database of a plurality of road links;

calculate a boundary separation distance for spacing vertices along a length of the road link;

determine a sequence of vertices along the road link according to the boundary separation distance;

for each vertex, generate a spatial boundary, wherein an overlap between spatial boundaries of adjacent vertices extends a first distance from the road link, wherein the first distance is a minimum distance from the road link;

provide for storage of a spatial boundary structure for the road link comprising the plurality of spatial boundaries associated with the road link;

receive a probe data point including a location;

determine a spatial boundary within which the probe data point location falls; and map match the probe data point to the road link.

9. The computer program product of claim 8, wherein the spatial boundary generated for each vertex comprises a circle having a radius less than the spatial boundary distance, and wherein an intersection between adjacent spatial boundaries along the road link is disposed at least a predefined tolerance distance from the road link.

10. The computer program product of claim 8, further comprising program code instructions configured to map match the received probe data point to a sub-segment of the road link based on the determined spatial boundary within the spatial boundary structure and a sub-segment of the road link corresponding to the vertex of the determined spatial boundary.

11. The computer program product of claim 8, wherein the road link is a first road link, the computer program product further comprising program code instructions configured to:

obtain a second road link from the database of a plurality of road links;

determine a sequence of vertices along the second road link according to the boundary separation distance;

for each vertex of the second road link, generate a spatial boundary, wherein an overlap between spatial boundaries of adjacent vertices extends a first distance from the second road link, wherein the first distance is a minimum distance from the second road link;

wherein the program code instructions to determine a spatial boundary within which the probe data point location falls comprises program code instructions to determine a first spatial boundary of the first road link within which the probe data point location falls and a second spatial boundary of the second road link within which the probe data point falls, the computer program product further including program code instructions to:

compute the probability of the probe data point belonging to the first road link;

compute the probability of the probe data point belonging to the second road link; and map match the probe data point to the one of the first road link or second road link with the higher probability.

12. The computer program product of claim 8, wherein the program code instructions to provide for storage of the spatial boundary structure for the road link comprises program code instructions to:

identify a map tile associated with the road link based on an anchor node of the road link; and provide for storage of the spatial boundary structure for the road link in association with the identified map tile.

13. The computer program product of claim 8, wherein the program code instructions to determine a sequence of vertices along the road link according to the boundary separation distance comprises program code instructions to:

identify a latitude and longitude of a first vertex of the sequence of vertices;

determine a directional angle of a next vertex of the sequence of vertices; and calculate a latitude and longitude of the next vertex based on the latitude and longitude of the first vertex, the boundary separation distance, and the directional angle of the next vertex.

14. The computer program product of claim 8, further comprising program code instructions to:

provide for at least one of navigation assistance or at least semi-autonomous vehicle control of a vehicle associated with the probe data point along the road link in response to the probe data point being map matched to the road link.

15. A method comprising:

obtaining a road link from a database of a plurality of road links;

calculating a boundary separation distance for spacing vertices along a length of the road link;

determining a sequence of vertices along the road link according to the boundary separation distance;

for each vertex, generating a spatial boundary, wherein an overlap between spatial boundaries of adjacent vertices extends a first distance from the road link, wherein the first distance is a minimum distance from the road link;

providing for storage of a spatial boundary structure for the road link comprising the plurality of spatial boundaries associated with the road link;

receiving a probe data point including a location;

determining a spatial boundary within which the probe data point location falls; and map matching the probe data point to the road link.

16. The method of claim 15, wherein the spatial boundary generated for each vertex comprises a circle having a radius less than the spatial boundary distance, and wherein an intersection between adjacent spatial boundaries along the road link is disposed at least a predefined tolerance distance from the road link.

17. The method of claim 15, further comprising map matching the received probe data point to a sub-segment of the road link based on the determined spatial boundary within the spatial boundary structure and a sub-segment of the road link corresponding to the vertex of the determined spatial boundary.

18. The method of claim 15, wherein the road link is a first road link, and wherein the method further comprises:

obtaining a second road link from the database of a plurality of road links;

determining a sequence of vertices along the second road link according to the boundary separation distance;

for each vertex of the second road link, generating a spatial boundary, wherein an overlap between spatial boundaries of adjacent vertices extends a first distance from the second road link, wherein the first distance is a minimum distance from the second road link;

wherein determining a spatial boundary within which the probe data point location falls comprises determining a first spatial boundary of the first road link within which the probe data point location falls and a second spatial boundary of the second road link within which the probe data point falls, the method further comprising:

computing the probability of the probe data point belonging to the first road link;

computing the probability of the probe data point belonging to the second road link; and map matching the probe data point to the one of the first road link or second road link with the higher probability.

19. The method of claim 15, wherein providing for storage of the spatial boundary structure for the road link comprises:

identifying a map tile associated with the road link based on an anchor node of the road link; and providing for storage of the spatial boundary structure for the road link in association with the identified map tile.

20. The method of claim 15, wherein determining a sequence of vertices along the road link according to the boundary separation distance comprises:

identifying a latitude and longitude of a first vertex of the sequence of vertices;

determining a directional angle of a next vertex of the sequence of vertices; and calculating a latitude and longitude of the next vertex based on the latitude and longitude of the first vertex, the boundary separation distance, and the directional angle of the next vertex.

* * * * *